(12) United States Patent
Chien

(10) Patent No.: US 10,688,537 B2
(45) Date of Patent: Jun. 23, 2020

(54) DISPLAY PANEL CLEANING MACHINE

(71) Applicants: HKC Corporation Limited, Shenzhen (CN); Chongqing HKC Optoelectronics Technology Co., ltd., Chongqing (CN)

(72) Inventor: Chung-Kuang Chien, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 275 days.

(21) Appl. No.: 15/848,273

(22) Filed: Dec. 20, 2017

(65) Prior Publication Data

US 2018/0250720 A1     Sep. 6, 2018

Related U.S. Application Data

(63) Continuation of application No. PCT/CN2017/089180, filed on Jun. 20, 2017.

(30) Foreign Application Priority Data

Mar. 3, 2017   (CN) .......................... 2017 1 0122564

(51) Int. Cl.
    *B08B 5/02*    (2006.01)
    *G02F 1/13*    (2006.01)
    *A47L 5/38*    (2006.01)

(52) U.S. Cl.
    CPC .............. *B08B 5/02* (2013.01); *G02F 1/1303* (2013.01); *A47L 5/38* (2013.01); *G02F 2001/1316* (2013.01)

(58) Field of Classification Search
    CPC . B08B 5/02; G02F 1/1303; G02F 2001/1316; A47L 5/38
    See application file for complete search history.

(56) References Cited

U.S. PATENT DOCUMENTS

| | | | |
|---|---|---|---|
| 7,100,235 B2 * | 9/2006 | Chin ..................... | G02F 1/1333 15/306.1 |
| 2015/0027490 A1 * | 1/2015 | Sun .......................... | B08B 5/02 134/1 |
| 2016/0291355 A1 * | 10/2016 | Liu ......................... | B08B 1/002 |

* cited by examiner

Primary Examiner — David Redding
(74) Attorney, Agent, or Firm — WPAT, PC

(57) ABSTRACT

A display panel cleaning machine is provided. The cleaning machine includes: a loading platform for loading a to-be-cleaned display panel, and an airflow mechanism disposed above the loading platform. The airflow mechanism includes ventilation ports disposed facing toward the loading platform. A baffle(s) is/are disposed outside the ventilation ports. Airflow flowing into and out from the airflow mechanism through the ventilation ports circulates along a predetermined direction and the display panel is cleaned in the circulation process.

10 Claims, 4 Drawing Sheets

DISPLAY PANEL CLEANING MACHINE

FIELD OF THE DISCLOSURE

The disclosure relates to the field of display technology, and more particularly to a display panel cleaning machine.

BACKGROUND

Liquid crystal displays are widely applied due to numerous advantages such as thin bodies, energy saving, radiation-free, etc. Most of liquid crystal displays available on the market are backlight-type liquid crystal displays, and such liquid crystal display includes a liquid crystal display panel and a backlight module. The working principle of the liquid crystal display panel is placing liquid crystal molecules between two parallel glass substrates and applying a driving voltage on the two glass substrates to control rotation directions of the liquid crystal molecules, for refracting rays from the backlight module to generate images.

A thin film transistor-liquid crystal display (TFT-LCD) gradually occupies the dominant position in the display realm at present because of its properties such as low energy consumption, superior image quality and relatively high production yield, etc. Identically, the TFT-LCD includes a liquid crystal display panel and a backlight module. The display panel includes a color filter (CF) substrate, a thin film transistor (TFT) array substrate and a mask. The opposite internal sides of the substrates have transparent electrodes. A layer of liquid crystal (LC) molecules is interposed between the two substrates.

However, in the process of manufacturing a display panel, a foreign matter will be adhered onto a surface of the substrates, and the position having the foreign matter adhered thereto would cause poor display quality when the display panel is at work. The method of using a specialized liquid cleaning tool to clean would require additional drying step and equipment, which not only would increase the time length of production process but also cause the increase of cost, and moreover the whole cleaning becomes cumbersome.

SUMMARY

A technical problem to be solved by the disclosure is to provide a convenient and efficient display panel cleaning machine.

An objective of the disclosure is achieved by following embodiments.

In particular, a display panel cleaning machine includes:

a loading platform, the loading platform being configured (i.e., structured and arranged) to load a to-be-cleaned display panel;

an airflow mechanism the airflow mechanism being disposed above the loading platform, the airflow mechanism including ventilation ports disposed facing toward the loading platform, a baffle being disposed outside the ventilation ports, airflow flowing into and out from the airflow mechanism through the ventilation ports being circulated along a predetermined direction to clean the display panel.

In an embodiment, the ventilation ports include an inhalation port and an exhalation port. The inhalation port and the exhalation port are juxtaposedly arranged above the loading platform. The baffle includes an inhalation baffle disposed outside the inhalation port or the baffle includes an exhalation baffle disposed outside the exhalation port, which is an embodiment of the baffle being disposed outside the ventilation ports. The configuration of one baffle is convenient and simple and the one baffle can be effectively disposed outside the inhalation port or the exhalation port as needed.

In an embodiment, the ventilation ports comprise an inhalation port and an exhalation port, the inhalation port and the exhalation port are juxtaposedly disposed above the loading platform. The baffle is multiple and the multiple baffles comprise an inhalation baffle disposed outside the inhalation port and an exhalation baffle disposed outside the exhalation port, which is an embodiment of the baffles being disposed outside the ventilation ports. The baffles correspondingly are disposed outside the inhalation port and the exhalation port respectively, the cleaning range is better expanded and the cleaning ability is improved.

In an embodiment, the ventilation ports include an inhalation port and an exhalation port, an opening position of the inhalation port is lower than an opening position of the exhalation port, the baffle is multiple and the multiple baffles include an inhalation baffle disposed outside the inhalation port and an exhalation baffle disposed outside the exhalation port. Such that, a gas chamber is formed by different opening positions of the inhalation port and the exhalation port in the vicinity of the exhalation port, directions and magnitudes of inhalation and exhalation airflows are beneficial to the change required for cleaning and achieve good cleaning ability for the display panel cleaning machine.

In an embodiment, the ventilation ports include an inhalation port and an exhalation port. The baffle includes an inhalation baffle disposed outside the inhalation port and the inhalation baffle has a magnetic bar disposed thereon, or the baffle includes an exhalation baffle disposed outside the exhalation port and the exhalation baffle has a magnetic bar disposed thereon. The magnetic bar can absorb metal particles that are not easily carried away by the airflow, so that the cleaning for the display panel is more comprehensive.

In an embodiment, the ventilation ports include an inhalation port and an exhalation port, an opening position of the inhalation port is lower than an opening position of the exhalation port, the baffle is multiple and the multiple baffles include an inhalation baffle disposed outside the inhalation port and an exhalation baffle disposed outside the exhalation port, the inhalation baffle has a magnetic bar disposed thereon, and the exhalation baffle has a magnetic bar disposed thereon. By using a formed gas chamber to improve inhalation and exhalation airflows and thereby improve cleaning ability and meanwhile disposing magnetic bars on the inhalation baffle and the exhalation baffle, it can well clean foreign matter sticking onto the panel.

In an embodiment, the airflow mechanism includes an inhalation part and an exhalation part, the inhalation part includes an inhalation port disposed facing toward the loading platform and a first inhalation chamber and a second inhalation chamber sequentially disposed above the inhalation port, the first inhalation chamber and the second inhalation chamber have an inhalation opening disposed therebetween for connection; the exhalation part includes an exhalation port disposed facing toward the loading platform and a first exhalation chamber and a second exhalation chamber sequentially disposed above the exhalation port, the first exhalation chamber and the second exhalation chamber are connected by an exhalation opening disposed between the first exhalation chamber and the second exhalation chamber. The inhalation part and the exhalation part are connected by a circulation port disposed between the second inhalation chamber and the second exhalation chamber.

In an embodiment, the inhalation part and the exhalation part have a partition chamber disposed therebetween. The inhalation opening and the inhalation port are disposed at a side of the inhalation part near the partition wall. The exhalation opening and the exhalation port are disposed at a side of the exhalation part near the partition wall. Projections of the inhalation opening and the inhalation port on the loading platform are overlapped, and the inhalation opening and the inhalation port are near to each other, which facilitate inhalation airflow to rapidly and sufficiently enter the inhalation part. Projections of the exhalation opening and the exhalation port on the loading platform are overlapped, and the exhalation opening and the exhalation port are near to each other, which facilitate exhalation airflow to rapidly and sufficiently exhaust from the exhalation part and ensure the airflow at a fixed flow to adequately clean the panel.

In an embodiment, the first inhalation chamber and the first exhalation chamber are polygonal, the second inhalation chamber and the second exhalation chamber are rectangular. By ensuring balance and stability of inhalation and exhalation flows under the principle of one exhalation following one inhalation and meanwhile preventing from destroying positive and negative pressure systems of whole cleaning machine itself caused by excessive inhaled or exhaled flow, the service lifespan of the display panel cleaning machine is prolonged.

In an embodiment, the display panel cleaning machine further includes a transport mechanism; the loading platform is disposed on the transport mechanism, and the transport mechanism moves in a preset direction. The loading platform moves in the preset direction along with the transport mechanism. The transport mechanism includes a positioning member for fixing the loading platform at a preset position. By the use of transport mechanism, it is convenient and simple to operate, and also can reduce the force and improve the working efficiency. The loading platform is adjustably disposed at the preset position, which facilitates to pick and place the display panel and also facilitates the maintenance and repair of the display panel cleaning machine repair if necessary.

The disclosure disposes a baffle(s) outside the ventilation ports facing toward the loading platform, airflow flowing into and out from the airflow mechanism through the ventilation ports has an increased range of action to the display panel loaded on the loading platform, the cleaning range to the panel is expanded from line to surface, the cleaning efficiency is increased and the dry type cleaning is convenient and concise.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the drawings.

DETAILED DESCRIPTION OF EMBODIMENTS

Figure 1:
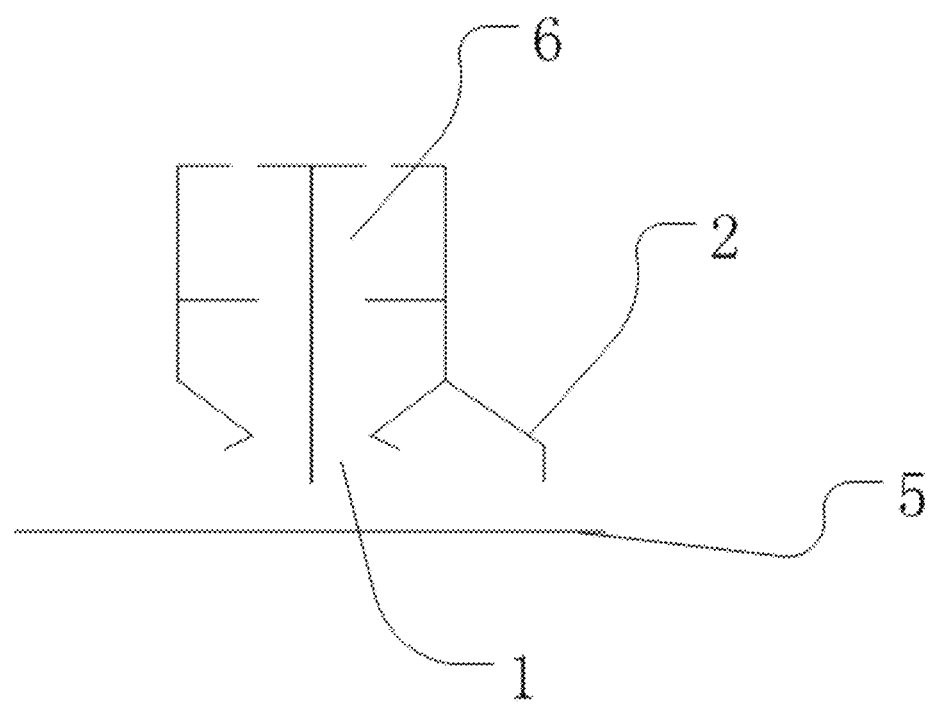
FIG. 1 is a schematic structural view of a display panel cleaning machine according to an embodiment of the disclosure.

The specific structural and functional details disclosed herein are only representative and are intended for describing exemplary embodiments of the disclosure. However, the disclosure can be embodied in many forms of substitution, and should not be interpreted as merely limited to the embodiments described herein.

In the description of the disclosure, terms such as "center", "transverse", "above", "below", "left", "right", "vertical", "horizontal", "top", "bottom", "inside", "outside", etc. for indicating orientations or positional relationships refer to orientations or positional relationships as shown in the drawings; the terms are for the purpose of illustrating the disclosure and simplifying the description rather than indicating or implying the device or element must have a certain orientation and be structured or operated by the certain orientation, and therefore cannot be regarded as limitation to the disclosure. Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more the features. In the description of the disclosure, unless otherwise indicated, the meaning of "a plurality of" is two or more than two. In addition, the term "include" and any variations thereof are meant to cover a non-exclusive inclusion.

In the description of the disclosure, it should be noted that, unless otherwise clearly stated and limited, terms "mounted", "connected with" and "connected to" should be understood broadly, for instance, can be a fixed connection, a detachable connection or an integral connection; can be a mechanical connection, can also be an electrical connection; can be a direct connection, can also be an indirect connection by an intermediary, can be an internal communication of two elements. A person skilled in the art can understand concrete meanings of the terms in the disclosure as per specific circumstances.

The terms used herein are only for illustrating concrete embodiments rather than limiting the exemplary embodiments. Unless otherwise indicated in the content, singular forms "a" and "an" also include plural. Moreover, the terms "include" and/or "contain" define the existence of described features, integers, steps, operations, units and/or components, but do not exclude the existence or addition of one or more other features, integers, steps, operations, units, components and/or combinations thereof.

The disclosure will be further described below with reference to accompanying drawings and preferred embodiments.

A structure of a display panel cleaning machine according to an embodiment of the disclosure will be described below with reference to FIG. 1 through FIG. 4. The cleaning machine includes: a loading platform 5, the loading platform 5 being configured (i.e., structured and arranged) to load a to-be-cleaned display panel; and an airflow mechanism 6, the airflow mechanism 6 being disposed above the loading platform 5. The airflow mechanism 6 includes ventilation ports 1 disposed facing toward the loading platform 5, a baffle 2 is disposed outside the ventilation ports 1, airflow flowing into and out from the airflow mechanism through the ventilation ports 1 circulates along a predetermined direction to clean the display panel. In the embodiment, because the baffle 2 is disposed outside the ventilation ports 1 facing toward the loading platform 5, the range of action of the airflow flowing into and out from the airflow mechanism 6 through the ventilation ports 1 and being applied onto the display panel loaded on the loading platform 5 is increased, the cleaning range applied onto the display panel is expanded from line to surface, the cleaning efficiency is improved, and the dry type cleaning is convenient and concise.

Specifically, the airflow mechanism 6 includes an inhalation part and an exhalation part, the inhalation part includes an inhalation port 11 disposed facing toward the loading platform 5 and a first inhalation chamber and a second inhalation chamber sequentially disposed above the inhalation port 11, and an inhalation opening is disposed between the first inhalation chamber and the second inhalation chamber for communication. The exhalation part includes an exhalation port 21 disposed facing toward the loading platform 5 and a first exhalation chamber and a second exhalation chamber sequentially disposed above the exhalation port 21, the first exhalation chamber and the second exhalation chamber are communicated by an exhalation opening disposed between the first exhalation chamber and the second exhalation chamber. The inhalation part and the exhalation part are communicated by a circulation port disposed between the second inhalation chamber and the second exhalation chamber.

A partition wall 3 is disposed between the inhalation part and the exhalation part, the inhalation opening and the inhalation port 11 are disposed at a side of the inhalation part near the partition wall 3. The exhalation opening and the exhalation port 21 are disposed at a side of the exhalation part near the partition wall 3. Projections of the inhalation opening and the inhalation port 11 on the loading platform 5 are overlapped, and the inhalation opening and the inhalation port 11 are near to each other, which facilitate inhalation airflow to rapidly and sufficiently flow into the inhalation part. Projections of the exhalation opening and the exhalation port 21 on the loading platform 5 are overlapped, and the exhalation opening and the exhalation port 21 are near to each other, which facilitate exhalation airflow to rapidly and sufficiently exhaust from the exhalation part and ensure the airflow at a fixed flow to adequately clean the panel.

The inhalation part and the exhalation part are symmetrically disposed at two sides of the partition wall 3. The first inhalation chamber and the first exhalation chamber are polygonal, the second inhalation chamber and the second exhalation chamber are rectangular. By ensuring balance and stability of inhalation and exhalation flows under a principle of one exhalation following one inhalation, and meanwhile preventing from destroying positive and negative pressure systems of whole cleaning machine itself resulting from excessive exhaled or inhaled flow, service lifespan of the display panel cleaning machine is prolonged. The first inhalation chamber 13 and the first exhalation chamber 23 are pentagonal, and correspondingly the circulation port of the second inhalation chamber 14 and the circulation port of the second exhalation chamber 24 are disposed in intermediate positions of corresponding chamber walls. Such that, the rate of airflow transferred from the inhalation part to the exhalation part can maintain at a rapid and full state.

As another embodiment of the disclosure, the cleaning machine includes: a loading platform 5, the loading platform 5 being for loading a to-be-cleaned display panel; and an airflow mechanism, the airflow mechanism being disposed above the loading platform 5. The airflow mechanism 6 includes ventilation ports 1 disposed facing toward the loading platform 5 and a baffle 2 disposed outside the ventilation ports 1. Airflow flowing into and out from the airflow mechanism 6 through the ventilation ports 1 circulates along a predetermined direction to clean the display panel. The ventilation ports 1 include an inhalation port 11 and an exhalation port 21. The inhalation port 11 and the exhalation port 21 are juxtaposedly disposed above the loading platform 5. An inhalation baffle 12 is disposed outside the inhalation port 11, which is an embodiment of the baffle 2 being disposed outside the ventilation ports 1.

Specifically, the airflow mechanism 6 includes an inhalation part and an exhalation part. The inhalation part includes the inhalation port 11 disposed facing toward the loading platform 5 and a first inhalation chamber and a second inhalation chamber sequentially disposed above the inhalation port 11. The first inhalation chamber and the second inhalation chamber have an inhalation opening disposed therebetween for communication. The exhalation part includes the exhalation port 21 disposed facing toward the loading platform 5 and a first exhalation chamber and a second exhalation chamber sequentially disposed above the exhalation port 21. The first exhalation chamber and the second exhalation chamber are communicated by an exhalation opening disposed between the first exhalation chamber and the second exhalation chamber. The inhalation part and the exhalation part are communicated by circulation ports disposed between the second inhalation chamber and the second exhalation chamber.

The inhalation part and the exhalation part have a partition wall 3 disposed therebetween. The inhalation opening and the inhalation port 11 are disposed at a side of the inhalation part near the partition wall 3. The exhalation opening and the exhalation port 21 are disposed at a side of the exhalation part near the partition wall 3. Projections of the inhalation opening and the inhalation port 11 on the loading platform 5 are overlapped, and the inhalation opening and the inhalation port 11 are near to each other, which facilitate inhalation airflow to rapidly and sufficiently enter the inhalation part. Projections of the exhalation opening and the exhalation port 21 on the loading platform 5 are overlapped, and the exhalation opening and the exhalation port 21 are near to each other, which facilitate exhalation airflow to rapidly and sufficiently exhaust from the exhalation part and ensure the airflow at a fixed flow to adequately clean the panel.

The inhalation part and the exhalation part are symmetrically disposed at two sides of the partition wall 3, the first inhalation chamber and the first exhalation chamber are polygonal, and the second inhalation chamber and the second exhalation chamber are rectangular. By ensuring the balance and stability of inhaled and exhaled flow under the principle of one exhalation following one inhalation, and meanwhile preventing from destroying positive and negative pressure systems of whole cleaning machine itself caused by excessive inhaled or exhaled flow, the service lifespan of the display panel cleaning machine is prolonged. The first inhalation chamber 13 and the first exhalation chamber 23 are pentagonal. The circulation port of the second inhalation chamber 14 and the circulation port of the second exhalation chamber 24 both are disposed in intermediate positions of corresponding chamber walls.

As another embodiment of the disclosure, the cleaning machine includes: a loading platform 5, the loading platform 5 being configured to load a to-be-cleaned display panel; and an airflow mechanism 6, the airflow mechanism 6 being disposed above the loading platform 5. The airflow mechanism 6 includes ventilation ports 1 disposed facing toward the loading platform 5 and a baffle 2 disposed outside the ventilation ports 1. Airflow flowing into and out from the airflow mechanism 6 through the ventilation ports 1 circulates along a predetermined direction to clean the display panel. The ventilation ports 1 include an inhalation port 11 and an exhalation port 21. The inhalation port 11 and the exhalation port 21 are juxtaposedly arranged above the loading platform 5. An exhalation baffle 21 is disposed outside the exhalation port 21, which is an embodiment of the baffle 2 being disposed outside the ventilation ports 1. The configuration of one baffle 2 is convenient and simple, and the baffle 2 may be effectively disposed outside the inhalation port 11 or outside the exhalation port 21 as required.

Specifically, the airflow mechanism 6 includes an inhalation part and an exhalation part. The inhalation part includes the inhalation port 11 disposed facing toward the loading platform 5 and a first inhalation chamber and a second inhalation chamber sequentially disposed above the inhalation port 11. The first inhalation chamber and the second inhalation chamber have an inhalation opening disposed therebetween for connection. The exhalation part includes the exhalation port 21 disposed facing toward the loading platform 5 and a first exhalation chamber and a second exhalation chamber sequentially disposed above the exhalation port 21. The first exhalation chamber and the second exhalation chamber are connected by an exhalation opening disposed between the first exhalation chamber and the second exhalation chamber. The inhalation part and the exhalation part are connected by circulation ports disposed between the second inhalation chamber and the second exhalation chamber.

The inhalation part and the exhalation part have a partition wall 3 disposed therebetween. The inhalation opening and the inhalation port 11 are disposed at a side of the inhalation part near the partition wall 3. The exhalation opening and the exhalation port 21 are disposed at a side of the exhalation part near the partition wall 3. Projections of the inhalation opening and the exhalation port 11 on the loading platform 5 are overlapped, and the inhalation opening and the exhalation port 11 are near to each other, which facilitate inhalation airflow to rapidly and sufficiently enter the inhalation part. Projections of the exhalation opening and the exhalation port 21 on the loading platform 5 are overlapped, and the exhalation opening and the exhalation port 21 are near to each other, which facilitate exhalation airflow to rapidly and sufficiently exhaust from the exhalation part and ensure the airflow at a fixed flow to adequately clean the panel.

The inhalation part and the exhalation part are symmetrically disposed at sides of the partition wall 3. The first inhalation chamber and the first exhalation chamber are polygonal, and the second inhalation chamber and the second exhalation chamber are rectangular. By ensuring balance and stability of inhalation and exhalation flows under the principle of one exhalation following one inhalation and meanwhile preventing from destroying positive and negative systems of whole cleaning machine itself caused by excessive inhaled or exhaled flow, the service lifespan of the display panel cleaning machine is prolonged. The first inhalation chamber 13 and the first exhalation chamber 23 are pentagonal. A circulation port of the second inhalation chamber 14 and a circulation port of the second exhalation chamber 24 both are disposed intermediate positions of corresponding chamber walls. Such that, the rate of airflow transferred from the inhalation part to the exhalation part can maintain at a rapid and sufficient state.

Figure 2:
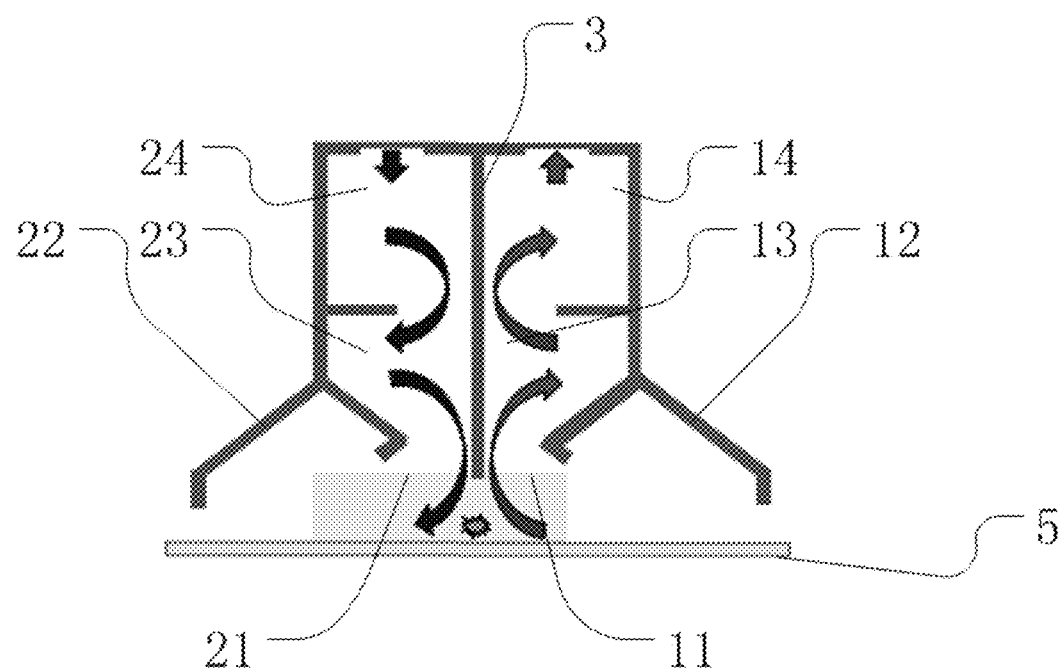
FIG. 2 a schematic structural view of a display panel cleaning machine according to another embodiment of the disclosure.

As another embodiment of the disclosure, as shown in FIG. 2, the cleaning machine includes: a loading platform 5, the loading platform 5 being configured to load a to-be-cleaned display panel; and an airflow mechanism 6, the airflow mechanism 6 being disposed above the loading platform 5. The airflow mechanism 6 includes ventilation ports 1 disposed facing toward the loading platform 5 and baffles 2 disposed outside the ventilation ports 1. Airflow flowing into and out from the airflow mechanism 6 through the ventilation ports 1 circulates along a predetermined direction to clean the display panel. The ventilation ports 1 include an inhalation port 11 and an exhalation port 21. The inhalation port 11 and the exhalation port 21 are juxtaposedly disposed above the loading platform 5. The baffles 2 include an inhalation baffle 12 disposed outside the inhalation port 11 and an exhalation baffle 22 disposed outside the exhalation port 21, which is an embodiment of the baffles being disposed outside the ventilation ports 1. The baffles 2 are correspondingly disposed outside the inhalation port 11 and the exhalation port 21 respectively, which better expands the cleaning range and improve the cleaning ability.

Specifically, the airflow mechanism 6 includes an inhalation part and an exhalation part. The inhalation part includes the inhalation port 11 disposed facing toward the loading platform 5 and a first inhalation chamber and a second inhalation chamber sequentially disposed above the inhalation port 11. The first inhalation chamber and the second inhalation chamber have an inhalation opening disposed therebetween for communication. The exhalation part includes the exhalation port 21 disposed facing toward the loading platform 5 and a first exhalation chamber and a second exhalation chamber sequentially disposed above the exhalation port 21. The first exhalation chamber and the second exhalation chamber are communicated by an exhalation opening disposed between the first exhalation chamber and the second exhalation chamber. The inhalation part and the exhalation part are communicated by circulation ports disposed between the second inhalation chamber and the second exhalation chamber.

The inhalation part and the exhalation part have a partition wall 3 disposed therebetween. The inhalation opening and the inhalation port 11 are disposed at a side of the inhalation part near the partition wall 3. The exhalation opening and the exhalation port 21 are disposed at a side of the exhalation part near the partition wall 3. Projections of the inhalation opening and the inhalation port 11 on the loading platform 5 are overlapped, and the inhalation opening and the inhalation port 11 are near to each other, which facilitate inhalation airflow to rapidly and sufficiently enter the inhalation part. Projections of the exhalation opening and the exhalation port 21 on the loading platform 5 are overlapped, and the exhalation opening and the exhalation port 21 are near to each other, which facilitate exhalation airflow to rapidly and sufficiently exhaust from the exhalation part and ensure the airflow at a fixed flow to adequately clean the panel.

The inhalation part and the exhalation part are symmetrically disposed at two sides of the partition wall 3, the first inhalation chamber and the first exhalation chamber are polygonal, and the second inhalation chamber and the second exhalation chamber are rectangular. By ensuring balance and stability of inhalation and exhalation flows under the principle of one inhalation following by one exhalation and meanwhile preventing from destroying positive and negative pressure systems of whole cleaning machine itself resulting from excessive inhaled or exhaled flow, the service lifespan of the display panel cleaning machine is prolonged. The first inhalation chamber 13 and the first exhalation chamber 23 are pentagonal, and correspondingly a circulation port of the second inhalation chamber 14 and a circulation port of the second exhalation chamber 24 both are disposed at intermediate positions of corresponding chamber walls. Such that, the rate of airflow transferred from the inhalation part to the exhalation part can maintain at a rapid and sufficient state.

Figure 3:
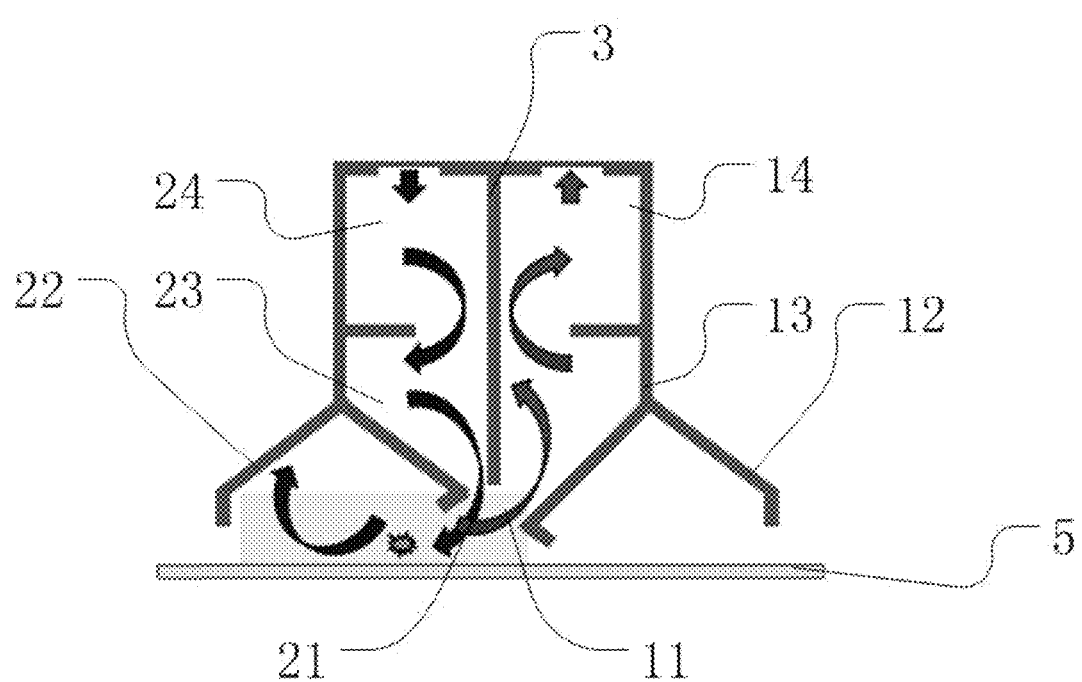
FIG. 3 is a schematic structural view of a display panel cleaning machine according to still another embodiment of the disclosure.

As another embodiment of the disclosure, as shown in FIG. 3, the cleaning machine includes: a loading platform 5, the loading platform 5 being configured to load a to-be-cleaned display panel; and an airflow mechanism 6, the airflow mechanism 6 being disposed above the loading platform 5. The airflow mechanism 6 includes ventilation ports 1 disposed facing toward the loading platform 5, baffles 2 are disposed outside the ventilation ports 1. Airflow flowing into and out from the airflow mechanism 6 through the ventilation ports 1 circulates along a predetermined direction to clean the display panel. The ventilation ports 1 include an inhalation port 11 and an exhalation port 21. An opening position of the inhalation port 11 is lower than an opening position of the exhalation port 21. The baffles 2 include an inhalation baffle 12 disposed outside the inhalation port 11 and an exhalation baffle 22 disposed outside the exhalation port 21. In the vicinity of the exhalation port 21, a gas chamber is formed by opening positions of the inhalation port 11 and the exhalation port 21 with different heights, directions and magnitudes of inhalation and exhalation airflows are beneficial to the change required for cleaning and achieve good cleaning ability for the display panel cleaning machine.

Specifically, the airflow mechanism 6 includes an inhalation part and an exhalation part. The inhalation part includes an inhalation port 11 disposed facing toward the loading platform 5 and a first inhalation chamber and a second inhalation chamber sequentially disposed above the inhalation port 11. The first inhalation chamber and the second inhalation chamber have an inhalation opening disposed therebetween for connection. The exhalation part includes an exhalation port 21 disposed facing toward the loading platform 5 and a first exhalation chamber and a second exhalation chamber sequentially disposed above the exhalation port 21. The first exhalation chamber and the second exhalation chamber are connected by an exhalation opening disposed between the first exhalation chamber and the second exhalation chamber. The inhalation part and the exhalation part are connected by circulation ports disposed between the second inhalation chamber and the second exhalation chamber.

The inhalation part and the exhalation part have a partition wall 3 disposed therebetween. The inhalation opening and the inhalation port 11 are disposed at a side of the inhalation part near the partition wall 3. The exhalation opening and the exhalation port 21 are disposed at a side of the exhalation part near the partition wall 3. Projections of the inhalation opening and the inhalation port 11 on the loading platform 5 are overlapped, and the inhalation opening and the inhalation port 11 are near to each other, which facilitate inhalation airflow to rapidly and sufficiently enter the inhalation part. Projections of the exhalation opening and the exhalation port 21 on the loading platform 5 are overlapped, and the exhalation opening and the exhalation port 21 are near to each other, which facilitate exhalation airflow to rapidly and sufficiently exhaust from the exhalation part and ensure the airflow at a fixed flow to adequately clean the panel.

The inhalation part and the exhalation part are symmetrically disposed at two sides of the partition wall 3. The first inhalation chamber and the first exhalation chamber are polygonal. The second inhalation chamber and the second exhalation chamber are rectangular. By ensuing balance and stability of inhalation and exhalation flows under the principle of one exhalation following one inhalation, and meanwhile preventing from destroying positive and negative pressure systems of whole cleaning machine itself resulting from excessive inhaled or exhaled flow, so that service life of the display panel cleaning machine is prolonged. The first inhalation chamber 13 and the first exhalation chamber 23 are pentagonal, and correspondingly the circulation port of the second inhalation chamber 14 and the circulation port of the second exhalation chamber 24 are disposed in intermediate positions of corresponding chamber walls. Such that, the flow rate of airflow transferred from the inhalation part to the exhalation part can maintain at a rapid and full state.

As another embodiment of the disclosure, the cleaning machine includes: a loading platform 5, the loading platform 5 being configured to load a to-be-cleaned display panel; and an airflow mechanism 6, the airflow mechanism 6 being disposed above the loading platform 5. The airflow mechanism 6 includes ventilation ports 1 disposed facing toward the loading platform 5, a baffle 2 is disposed outside the ventilation ports 1. Airflow flowing into and out from the airflow mechanism 6 through the ventilation ports 11 circulates along a predetermined direction to clean the display panel. The baffle 2 includes an inhalation baffle 12 disposed outside the inhalation port 11, and the inhalation baffle 12 has a magnetic bar 4 disposed thereon. The magnetic bar 4 can absorb metal particles which are not easily carried away by the airflow, so that the cleaning of the display panel is more comprehensive.

Specifically, the airflow mechanism 6 includes an inhalation part and an exhalation part. The inhalation part includes an inhalation port 11 disposed facing toward the loading platform 5 and a first inhalation chamber and a second inhalation chamber sequentially disposed above the inhalation port 11. The first inhalation chamber and the second inhalation chamber have an inhalation opening disposed therebetween for connection. The exhalation part includes an exhalation port 21 disposed facing toward the loading platform 5 and a first exhalation chamber and a second exhalation chamber sequentially disposed above the exhalation port 21. The first exhalation chamber and the second exhalation chamber are connected by an exhalation opening disposed between the first exhalation chamber and the second exhalation chamber. The inhalation part and the exhalation part are connected by circulation ports disposed between the second inhalation chamber and the second exhalation chamber.

The inhalation part and the exhalation part have a partition wall 3 disposed therebetween. The inhalation opening and the inhalation port 11 are disposed at a side of the inhalation part near the partition wall 3. The exhalation opening and the exhalation port 21 are disposed at a side of the exhalation part near the partition wall 3. Projections of the inhalation opening and the inhalation port 11 on the loading platform 5 are overlapped, and the inhalation opening and the inhalation port 11 are near to each other, which facilitate inhalation airflow to rapidly and sufficiently enter the inhalation part. Projections of the exhalation opening and the exhalation port 21 on the loading platform 5 are overlapped, and the exhalation opening and the exhalation port 21 are near to each other, which facilitate exhalation airflow to rapidly and sufficiently exhaust from the exhalation part and ensure the airflow at a fixed flow to adequately clean the panel.

The inhalation part and the exhalation part are symmetrically disposed at two sides of the partition wall 3. The first inhalation chamber and the first exhalation chamber are polygonal, the second inhalation chamber and the second exhalation chamber are rectangular. By ensuring balance and stability of inhalation and exhalation flows under the principle of one exhalation following one inhalation, and meanwhile preventing from destroying positive and negative pressure systems of whole cleaning machine itself caused by excessive inhaled or exhaled flow, the service life of the display panel cleaning machine is prolonged. The first inhalation chamber 13 and the first exhalation chamber 23 are pentagonal, and correspondingly the circulation port of the second inhalation chamber 14 and the circulation port of the second exhalation chamber 24 both are disposed at intermediate positions of corresponding chamber walls. Such that, flow rate of airflow transported from the inhalation part to the exhalation part can maintain at a rapid and full state.

As another embodiment of the disclosure, the cleaning machine includes: a loading platform 5, the loading platform 5 being for loading a to-be-cleaned display panel; and an airflow mechanism 6, the airflow mechanism 6 being disposed above the loading platform 5. The airflow mechanism 6 includes ventilation ports 1 disposed facing toward the loading platform 5, a baffle 2 is disposed outside the ventilation ports 1. Airflow flowing into and out from the airflow mechanism 6 through the ventilation ports 1 circulates along a predetermined direction to clean the display panel. The baffle 2 includes an exhalation baffle 22 disposed outside the exhalation port 21, and the exhalation baffle 22 has a magnetic bar 4 disposed thereon. The magnetic bar 4 can absorb metal particles which are not easily carried away by the airflow, so that the cleaning of the display panel is more comprehensive.

Specifically, the airflow mechanism 6 includes an inhalation part and an exhalation part. The inhalation part includes an inhalation port 11 disposed facing toward the loading platform 5 and a first inhalation chamber and a second inhalation chamber sequentially disposed above the inhalation port 11. The first inhalation chamber and the second inhalation chamber have an inhalation opening disposed therebetween for connection. The exhalation part includes an exhalation port 21 disposed facing toward the loading platform 5 and a first exhalation chamber and a second exhalation chamber sequentially disposed above exhalation port 21. The first exhalation chamber and the second exhalation chamber are connected by an exhalation opening disposed between the first exhalation chamber and the second exhalation chamber. The inhalation part and the exhalation part are connected by circulation ports disposed between the second inhalation chamber and the exhalation chamber.

The inhalation part and the exhalation part have a partition wall 3 disposed therebetween. The inhalation opening and the inhalation port 11 are disposed at a side of the inhalation part near the partition wall 3. The exhalation opening and the exhalation port 21 are disposed at a side of the exhalation part near the partition wall 3. Projections of the inhalation opening and the inhalation port 11 on the loading platform 5 are overlapped, and the inhalation opening and the inhalation port 11 are near to each other, which facilitate inhalation airflow to rapidly and sufficiently enter the inhalation part. Projections of the exhalation opening and the exhalation port 21 on the loading platform 5 are overlapped, and the exhalation opening and the exhalation port 21 are near to each other, which facilitate exhalation airflow to rapidly and sufficiently exhaust from the exhalation part and ensure the airflow at a fixed flow to adequately clean the panel.

The inhalation part and the exhalation part are symmetrically arranged at two sides of the partition wall 3. The first inhalation chamber and the first exhalation chamber are polygonal. The second inhalation chamber and the second exhalation chamber are rectangular. By ensuring balance and stability of inhalation and exhalation flows under the principle of one exhalation following one inhalation, and meanwhile preventing from destroying positive and negative pressure systems of whole cleaning machine itself caused by excessive inhaled or exhaled flow, the service life of the display panel cleaning machine is prolonged. The first inhalation chamber 13 and the first exhalation chamber 23 are pentagonal, and correspondingly the circulation port of the second inhalation chamber 14 and the circulation port of the second exhalation chamber 24 both are disposed at intermediate positions of corresponding chamber walls. Such that, the flow rate of airflow transported from the inhalation part to the exhalation part can maintain at a rapid and sufficient state.

Figure 4:
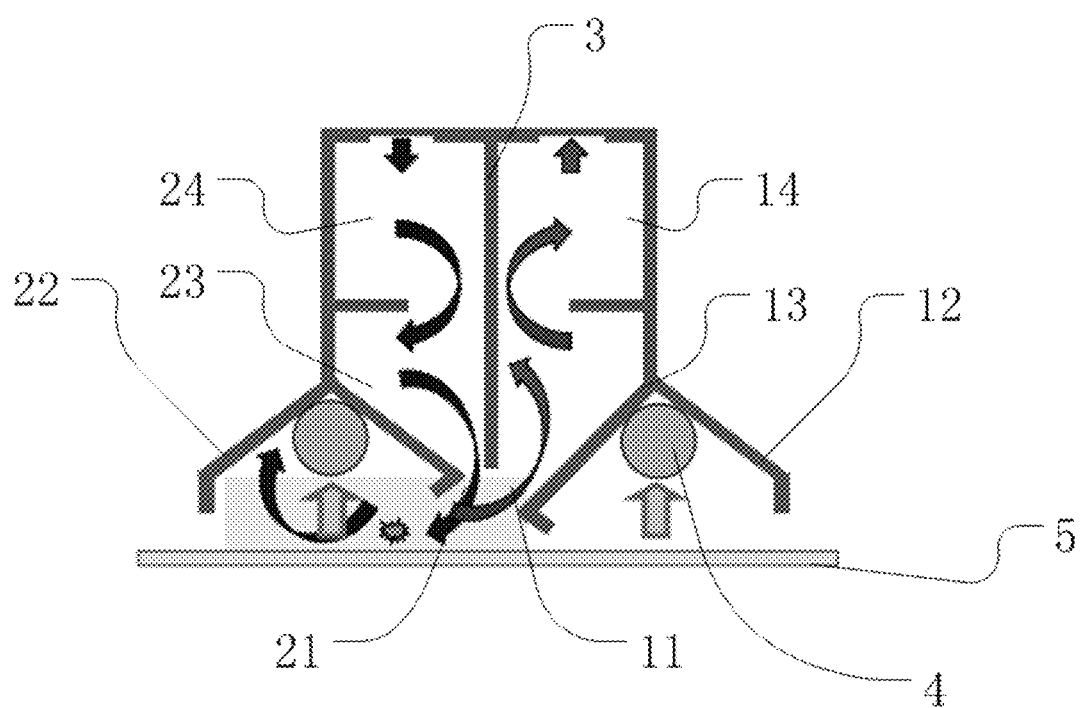
FIG. 4 is a schematic structural view of a display panel cleaning machine according to even still another embodiment of the disclosure.

As another embodiment of the disclosure, as shown in FIG. 4, the ventilation ports 1 include an inhalation port 11 and an exhalation port 21. An opening position of the inhalation port 11 is lower than an opening position of the exhalation port 21. The baffles 2 include an inhalation baffle 12 disposed outside the inhalation port 11 and an exhalation baffle 22 disposed outside the exhalation port 21. The inhalation baffle 12 has a magnetic bar 4 disposed thereon, and the exhalation baffle 22 has a magnetic bar 4 disposed thereon. By using the formed gas chamber to improve inhalation and exhalation airflows and thereby enhance cleaning ability and meanwhile disposing magnetic bars 4 on the inhalation baffle 12 and the exhalation baffle 22, it can better clean the foreign matter adhering to the panel.

Specifically, the airflow mechanism 6 includes an inhalation part and an exhalation part. The inhalation part includes an inhalation port 11 disposed facing toward the loading platform 5 and a first inhalation chamber and a second inhalation chamber sequentially disposed above the inhalation port 11. The first inhalation chamber and the second inhalation chamber have an inhalation opening disposed therebetween for connection. The exhalation part includes an exhalation port 21 disposed facing toward the loading platform 5 and a first exhalation chamber and a second exhalation chamber sequentially disposed above exhalation port 21. The first exhalation chamber and the second exhalation chamber are connected by an exhalation opening disposed between the first exhalation chamber and the second exhalation chamber. The inhalation part and the exhalation part are connected by circulation ports disposed between the second inhalation chamber and the exhalation chamber.

The inhalation part and the exhalation part have a partition wall 3 disposed therebetween. The inhalation opening and the inhalation port 11 are disposed at a side of the inhalation part near the partition wall 3. The exhalation opening and the exhalation port 21 are disposed at a side of the exhalation part near the partition wall 3. Projections of the inhalation opening and the inhalation port 11 on the loading platform 5 are overlapped, and the inhalation opening and the inhalation port 11 are near to each other, which facilitate inhalation airflow to rapidly and sufficiently enter the inhalation part. Projections of the exhalation opening and the exhalation port 21 on the loading platform 5 are overlapped, and the exhalation opening and the exhalation port 21 are near to each other, which facilitate exhalation airflow to rapidly and sufficiently exhaust from the exhalation part and ensure the airflow at a fixed flow to adequately clean the panel.

The inhalation part and the exhalation part are symmetrically arranged at two sides of the partition wall 3. The first inhalation chamber and the first exhalation chamber are polygonal. The second inhalation chamber and the second exhalation chamber are rectangular. By ensuring balance and stability of inhalation and exhalation flows under the principle of one exhalation following one inhalation, and meanwhile preventing from destroying positive and negative pressure systems of whole cleaning machine itself caused by excessive inhaled or exhaled flow, the service life of the display panel cleaning machine is prolonged. The first inhalation chamber 13 and the first exhalation chamber 23 are pentagonal, and correspondingly the circulation port of the second inhalation chamber 14 and the circulation port of the second exhalation chamber 24 both are disposed at intermediate positions of corresponding chamber walls. Such that, the flow rate of airflow transported from the inhalation part to the exhalation part can maintain at a rapid and sufficient state.

As another embodiment of the disclosure, the display panel cleaning machine further includes a blower. The inhalation port 11 is connected with the blower. The blower can increase the airflow and produce larger inhalation and exhalation flows for cleaning.

As another embodiment of the disclosure, the display panel cleaning machine further includes a transport mechanism. The loading platform 5 is disposed on the transport mechanism, and the transport mechanism moves in a preset direction. By the use of transport mechanism, it is simple to operate and can reduce applied force and improve working efficiency. The transport mechanism may employ a conveyor belt or a roller structure.

Specifically, the loading platform 5 moves in the preset direction along with the movement of the transport mechanism. The transport mechanism includes a positioning member configured to fix the loading platform 5 at a preset position. The loading platform 5 is adjustably disposed at the preset position, it is beneficial to pick and place the display panel and realize the maintenance and repair of the display panel cleaning machine if necessary. Before a cleaning, the loading platform 5 is disposed away from the position just below the airflow mechanism 6 by the positioning member and a to-be-cleaned display panel then is loaded and thus it can avoid damage caused by unnecessary collision owing to wide view, after that the loading platform 5 have been loaded with the display panel is moved to just below the airflow mechanism 6 along with the transport mechanism. After the cleaning, the loading platform 5 is moved away from the position just below the airflow mechanism 6 so as to remove the display panel.

As another embodiment of the disclosure, a cleaning rod extends upwardly from an edge of the loading platform 5 and is parallel to the loading platform 5. The cleaning rod is provided with bristles. When the loading platform 5 carries the display panel for cleaning, the bristles are contacted with the display panel. By the contact between the bristles and the display panel when in operation, it can further increase cleaning efficiency and achieve better cleanness. The bristles is rotatable around the cleaning rob.

The foregoing contents are detailed description of the disclosure in conjunction with specific preferred embodiments, and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A display panel cleaning machine, comprising
a loading platform;
an airflow mechanism, disposed above the loading platform, wherein the airflow mechanism comprises ventilation ports disposed facing toward the loading platform, baffles are disposed outside the ventilation ports, and airflow flowing into and out from the airflow mechanism through the ventilation ports circulates along a predetermined direction to clean a display panel;
wherein the ventilation ports comprise an inhalation port and an exhalation port, the inhalation port and the exhalation port are juxtaposedly disposed above the loading platform, and the baffles comprise an inhalation baffle disposed outside the inhalation port and an exhalation baffle disposed outside the exhalation port; or the ventilation ports comprise an inhalation port and an exhalation port, an opening position of the inhalation port is lower than an opening position of the exhalation port, and the baffles comprise an inhalation baffle disposed outside the inhalation port and an exhalation baffle disposed outside the exhalation port; or the ventilation ports comprise an inhalation port and an exhalation port, an opening position of the inhalation port is lower than an opening position of the exhalation port, the baffles comprise an inhalation baffle disposed outside the inhalation port and an exhalation baffle disposed outside the exhalation port, the inhalation baffle has a magnetic bar disposed thereon, and the exhalation baffle has a magnetic bar disposed thereon;
wherein the airflow mechanism comprises an inhalation part and an exhalation part, the inhalation part comprises the inhalation port disposed facing toward the loading platform and a first inhalation chamber and a second inhalation chamber sequentially disposed above the inhalation port, and the first inhalation chamber and the second inhalation chamber have an inhalation opening disposed therebetween for communication; the exhalation part comprises the exhalation port disposed facing toward the loading platform and a first exhalation chamber and a second exhalation chamber sequentially disposed above the exhalation port, and the first exhalation chamber and the second exhalation chamber are communicated by an exhalation opening disposed between the first exhalation chamber and the second exhalation chamber; the inhalation part and the exhalation part are communicated by circulation ports disposed between the second inhalation port and the second exhalation port; the inhalation part and the exhalation part have a partition wall disposed therebetween, the inhalation opening and the inhalation port are disposed at a side of the inhalation part near the partition wall, the exhalation opening and the exhalation port are disposed at a side of the exhalation part near the partition wall; the first inhalation chamber and the first exhalation chamber are polygonal, and the second inhalation chamber and the second exhalation chamber are rectangular.

2. A display panel cleaning machine, comprising
a loading platform;
an airflow mechanism, disposed above the loading platform, wherein the airflow mechanism comprises ventilation ports disposed facing toward the loading platform, a baffle is disposed outside the ventilation ports, and airflow flowing into and out from the airflow mechanism through the ventilation ports circulates along a predetermined direction to clean a display panel;
wherein the airflow mechanism comprises an inhalation part and an exhalation part, the inhalation part comprises an inhalation port disposed facing toward the loading platform and a first inhalation chamber and a second inhalation chamber sequentially disposed above the inhalation port, and the first inhalation chamber and the second inhalation chamber have an inhalation opening disposed therebetween for communication; the exhalation part comprises an exhalation port disposed facing toward the loading platform and a first exhalation chamber and a second exhalation chamber sequentially disposed above the exhalation port, the first exhalation chamber and the second exhalation chamber are communicated by an exhalation opening disposed between the first exhalation chamber and the second exhalation chamber; the inhalation part and the exhalation part are communicated by a circulation port disposed between the second inhalation chamber and the second exhalation chamber.

3. The display panel cleaning machine as claimed in claim 2, wherein the ventilation ports comprise an inhalation port and an exhalation port, the inhalation port and the exhalation port are juxtaposedly arranged above the loading platform, the baffle comprises an inhalation baffle disposed outside the inhalation port, or the baffle comprises an exhalation baffle disposed outside the exhalation port.

4. The display panel cleaning machine as claimed in claim 2, wherein the ventilation ports comprise an inhalation port and an exhalation port, the inhalation port and the exhalation port are juxtaposedly disposed above the loading platform, the baffle is multiple and the multiple baffles comprise an inhalation baffle disposed outside the inhalation port and an exhalation baffle disposed outside the exhalation port.

5. The display panel cleaning machine as claimed in claim 2, wherein the ventilation ports comprise an inhalation port and an exhalation port, an opening position of the inhalation port is lower than an opening position of the exhalation port, the baffle is multiple and the multiple baffles comprise an inhalation baffle disposed outside the inhalation port and an exhalation baffle disposed outside the exhalation port.

6. The display panel cleaning machine as claimed in claim 2, wherein the ventilation ports comprise an inhalation port and an exhalation port; the baffle comprises an inhalation baffle disposed outside the inhalation port, and the inhalation baffle has a magnetic bar disposed thereon; or the baffle comprises an exhalation baffle disposed outside the exhalation port, and the exhalation baffle has a magnetic bar disposed thereon.

7. The display panel cleaning machine as claimed in claim 2, wherein the ventilation ports comprise an inhalation port and an exhalation port, an opening position of the inhalation port is lower than an opening position of the exhalation port, the baffle is multiple and the multiple baffles comprise an inhalation baffle disposed outside the inhalation port and an exhalation baffle disposed outside the exhalation port, the inhalation baffle has a magnetic bar disposed thereon, and the exhalation baffle has a magnetic bar disposed thereon.

8. The display panel cleaning machine as claimed in claim 2, wherein the inhalation part and the exhalation part have a partition wall disposed therebetween, the inhalation opening and the inhalation port are disposed at a side of the inhalation part near the partition wall, the exhalation opening and the exhalation port are disposed at a side of the exhalation part near the partition wall.

9. The display panel cleaning machine as claimed in claim 2, wherein the first inhalation chamber and the first exhalation chamber are polygonal, and the second inhalation chamber and the second exhalation chamber are rectangular.

10. The display panel cleaning machine as claimed in claim 2, wherein the display panel cleaning machine further comprises a transport mechanism, the loading platform is disposed on the transport mechanism, and the transport mechanism moves in a preset direction; the loading platform moves in the preset direction along with the transport mechanism, the transport mechanism comprises a positioning member configured to fix the loading platform in a preset position.

* * * * *